Patented Nov. 5, 1929

1,734,646

UNITED STATES PATENT OFFICE

WALTER P. RALEIGH, OF AMES, IOWA, AND CROMWELL B. DICKEY, OF MILWAUKEE, WISCONSIN, ASSIGNORS TO PITTSBURGH PLATE GLASS COMPANY, A CORPORATION OF PENNSYLVANIA

ART OF DISINFECTING SEEDS

No Drawing. Application filed February 1, 1928. Serial No. 251,221.

The present invention relates to improvements in the art of disinfecting corn or like seeds and to the treated seed products. While the present invention is particularly applicable to seed corn, in preventing attack by certain known internal parasites as Diplodia zeae, Basisporium gallarum and Gibberella sanbinetii, it is not limited thereto, as it may be employed in treating seeds subject to attack by dry rots and surface-born fungi. However, it is not applicable to certain internal plant parasites, as the loose smuts on wheat and barley.

In carrying out the present invention, we apply to the seeds to be treated or disinfected an adherent, finely pulverized material or dust comprising an inert material, such as graphite, silica, talc or other siliceous material and an oxide of mercury. The oxide of mercury may be prepared in any suitable manner and any of the stable oxides may be employed, although we prefer to use the yellow oxide of mercury. The insoluble inert material, in finely pulverized form, is thoroughly intermingled with the desired proportion of finely divided oxide of mercury to produce a substantially uniform mixture.

The oxides of mercury are effective when present in the composition in proportions to provide 2.5% mercury or higher. In general, it is preferred to employ the oxide of mercury in proportion sufficient to give 8 to 10% mercury in the composition. Very substantially higher proportions may be employed, up to about 50% mercury, without appreciable injury to the seeds to which the composition is employed.

The inert material may be any finely powdered, adherent inactive insoluble substance, such as finely divided silica, kieselguhr, silicates, such as talc, graphite or the like. Different inert constituents may be mixed, if desired. The use of graphite as part or all of the inert material is particularly advantageous, by reason of its lubricating effect upon the planting machinery in which the treated seed is used.

The composition containing the oxide of mercury is applied to the seeds to become superficially associated with them, ordinarily about 2 ounces being consumed per bushel of seed.

We claim:

1. The herein described process of disinfecting corn and like seeds consisting in dusting the same with finely divided particles containing oxide of mercury.

2. The herein described process of disinfecting corn and like seeds comprising dusting the same with finely divided particles of inert matter admixed with yellow oxide of mercury.

3. The herein described process of disinfecting corn and like seeds consisting in dusting the seeds with finely divided particles of solid inert carrier comprising graphite, admixed with oxide of mercury.

4. The herein described finely powdered disinfectant for corn and like seeds comprising a solid inert carrier and an oxide of mercury.

5. The herein described finely pulverized disinfectant for corn and like seeds containing a solid inert carrier and yellow oxide of mercury in proportion to supply at least 2.5% mercury.

6. The herein described finely powdered disinfectant for corn and like seeds consisting of a solid inert carrier and yellow oxide of mercury in proportion to supply 8 to 10% mercury.

7. The herein described finely powdered disinfectant for corn and like seeds consisting of a solid inert carrier comprising graphite and an oxide of mercury.

8. Seeds superficially associated with a solid, water-insoluble inert carrier intermingled with an oxide of mercury.

9. Seeds superficially associated with a solid inert carrier intermingled with yellow oxide of mercury.

WALTER P. RALEIGH.
CROMWELL B. DICKEY.

DISCLAIMER 1,734,646.—*Walter P. Raleigh*, Ames, Iowa, and *Cromwell B. Dickey*, Milwaukee, Wis. ART OF DISINFECTING SEEDS. Patent dated November 5, 1929. Disclaimer filed January 22, 1932, by the patentees and the assignee, *Pittsburgh Plate Glass Co.*

Hereby enter this disclaimer to the claims of said patent and to each of them.
[*Official Gazette February 23, 1932.*]